United States Patent [19]

Kubicek

[11] 3,880,933

[45] Apr. 29, 1975

[54] HYDROGENATION OF CARBON DISULFIDE TO METHYL MERCAPTAN IN PRESENCE OF HYDROGEN SULFIDE

[75] Inventor: Donald H. Kubicek, Bartlesville, Okla.

[73] Assignee: Phillips Petroleum Company, Bartlesville, Okla.

[22] Filed: May 2, 1973

[21] Appl. No.: 356,414

[52] U.S. Cl............................................ 260/609 R
[51] Int. Cl........................................... C07c 149/06
[58] Field of Search .................................. 260/609 R

[56] References Cited
UNITED STATES PATENTS
3,488,739  1/1970  van Venroog................... 260/609 R

*Primary Examiner*—Lewis Gotts
*Assistant Examiner*—D. R. Phillips

[57] ABSTRACT

The conversion of carbon disulfide by hydrogenation in presence of a sulfactive hydrogenation catalyst to methyl mercaptan is conducted in presence of hydrogen sulfide added in an amount effective to permit an increase in space velocity such that increased conversion of carbon disulfide to methyl mercaptan at the expense of dimethyl sulfide is obtained. Dimethyl sulfide, also produced, is reduced, higher space velocities are attained over a broad range with increase in conversion of $CS_2$, the $H_2S$ moderating the reaction or modifying same to yield the obtained results. Generally, very considerable increase in mol ratio of $CH_3SH/(CH_3)_2S$ is obtained.

3 Claims, No Drawings

HYDROGENATION OF CARBON DISULFIDE TO METHYL MERCAPTAN IN PRESENCE OF HYDROGEN SULFIDE

This invention relates to the hydrogenation of carbon disulfide to convert the same to methyl mercaptan or methyl thiol. In one of its aspects, the hydrogenation is effected in the presence of a sulfactive hydrogenation catalyst. In another of its aspects, the invention makes use of hydrogen sulfide.

In one of its concepts, the invention provides a process for the conversion of carbon disulfide to methyl thiol by hydrogenation employing hydrogen, hydrogen sulfide and a sulfactive hydrogenation catalyst, the $H_2S$ being present in an amount effective to permit substantially increased space velocities, e.g. the $H_2S$ to $CS_2$ ratio being of the order of at least about 0.5/1 on a molar basis.

I have found that the inclusion of $H_2S$ in the feed to the reaction zone, as noted above, during hydrogenation of carbon disulfide to produce methyl thiol, unavoidably obtaining also dimethyl sulfide, permits very considerably to increase the space velocity of the feed stream. Carbon disulfide conversion surprisingly is increased over a broad range of increased space velocities which are possible even while the ratio of methyl mercaptan to dimethyl sulfide is considerably increased.

It is an object of this invention to provide a process for the conversion of carbon disulfide to methyl thiol. It is another object of the invention to provide an improved process for the conversion of carbon disulfide by hydrogenation in the presence of sulfactive hydrogenation catalysts. It is a further object of the invention to provide a modified process for the hydrogenation of carbon disulfide to methyl thiol.

Other aspects, concepts, objects, and the several advantages of the invention are apparent from a study of this disclosure and the appended claims.

According to the present invention, the conversion of or hydrogenation of carbon disulfide to form methyl thiol is conducted in presence of hydrogen sulfide in an amount with respect to the carbon disulfide effective to permit substantially over a broad range an increase in space velocity with concomitant increase in conversion of carbon disulfide to methyl mercaptan at the expense of dimethyl sulfide.

U.S. Pat. No. 3,488,739, issued Jan. 6, 1970, which deals with preparation of methyl mercaptan and dimethyl sulfide, shows the reaction which comprises passing carbon disulfide and an excess of hydrogen in the gaseous or vapor state over a sulfactive hydrogenation catalyst at an elevated temperature and a pressure of from about atmospheric to about 1,000 p.s.i. to prepare methyl mercaptan and/or dimethyl sulfide. The patent also states that by recycling the dimethyl sulfide with $H_2S$, methyl mercaptan is produced at the expense of dimethyl sulfide. By recycling methyl mercaptan, dimethyl sulfide is produced at the expense of the methyl mercaptan. The relative amounts of the primary products can be accordingly controlled to a high degree according to the patent. The patent also shows among equations therein given the conversion of methyl mercaptan to dimethyl sulfide and hydrogen sulfide. It is also stated that this reaction is a reversible catalyzed disproportionation which permits the control of the relative amounts of dimethyl sulfide and methyl mercaptan being formed.

According to the present invention, by operating as herein described, it has been found unexpectedly that as more and more hydrogen sulfide was added to a constant carbon disulfide-hydrogen feed the per-pass conversion of carbon disulfide remained nearly constant even though the space velocity had been increased by almost three-fold. Thus, it was strange and unexpected to be able to operate at increased space velocities yet without loss of conversion. This increase in space velocity result could not be duplicated using nitrogen, as shown by tabular data herein. Indeed there appears to be an effect of the $H_2S$ to $CS_2$ ratio as space velocity is increased, which I have discovered which does not appear to have been fathomable based upon available knowledge of the chemistry of this kind of reaction.

In studies made to determine what effect space velocity would have on the reaction of hydrogen with carbon disulfide, in the absence of hydrogen sulfide, at a given temperature and pressure the space velocity was changed in several different ways. In one procedure this was done by increasing both the carbon disulfide and hydrogen feed rates keeping them at the same ratio. In another procedure, the space velocity was also increased by adding a diluent to the carbon disulfide-hydrogen feed kept constant in both rate and ratio.

As space velocity was increased by increasing the feed rates of the carbon disulfide and hydrogen, the per-pass conversion of the carbon disulfide decreased as expected. There appeared to be little effect on the ratio of products methyl mercaptan to methyl sulfide caused by this change in space velocity.

Further, a similar result was obtained when the space velocity was increased by adding a nitrogen diluent keeping the carbon disulfidehydrogen feed constant in both rate and ratio. Here, too, the per-pass conversion of carbon disulfide decreased with the increased space velocity caused by the addition of nitrogen and the ratio of products was not affected to any extent by the addition of the nitrogen.

Accordingly, it appears that it must be accepted as unexpected that the per-pass conversion of carbon disulfide could remain nearly constant, in presence of added hydrogen sulfide, even though the space velocity has been increased by almost three-fold.

Catalysts — Catalysts suitable for use in the instant invention can be defined as sulfactive hydrogenation catalysts and are broadly described. By sulfactive hydrogenation catalyst, it is meant the sulfides of Group VI and Group VIII metals either alone or in combination. For example, the sulfides of cobalt, nickel, molybdenum, iron, tungsten, chromium, platinum, etc. Usually the catalytic material is deposited on a support such as activated carbon, alumina, zirconia, thoria, pumice, silica and silica-aluminum compositions. Combinations of nickel or cobalt with molybdenum are generally among the most preferred of such catalysts. Quite effective catalysts of the foregoing preferred combinations but in the oxide form are available commercially. One such catalyst is available under the designation Aero HDS-3A; Aero HDS-3A comprises NiO (3 weight percent), $MoO_3$ (15 weight percent), and small amounts of $Na_2$ (about 0.02 percent) and phosphorus (about 1.5 percent), the remainder being alumina. It is easily sulfided using well-known and conventional sulfiding conditions, conventional techniques and equipment. For example, using $H_2S$ and hydrogen at about 350° to 650° F and pressures of about atmospheric to 300 p.s.i. Since many of the suitable catalysts are commercially available in the oxide form they can be sulfided prior to use or, preferably, employed directly in the oxide form since sulfiding appears to readily occur in situ in the instant invention. One such commercially available catalyst that is preferred for use in the process of this invention is designated Aero HDS-2 and has the following composition: CoO (3–4 percent by weight), $MoO_3$ (15–16%), $Na_2O$ (0.4%), Fe (0.05%), the remainder being alumina. This catalyst is commonly referred to as cobalt molybdate on alumina.

One skilled in the art in possession of this disclosure having studied the same will recognize that the invention is not limited, necessarily, to catalysts here described. Having the concept of the invention before him, he will be able to select catalysts with which to obtain the advantages of the invention.

Mol Ratio $H_2S$ to $CS_2$ — The mol ratio of $H_2S$ to $CS_2$ employed in the feedstream for this invention is broadly within the range of from 0.5/1 to 20/1 and preferably within the range of from 1.5/1 to 10/1. It is recognized that ratios greater than 20/1 would be operable. However, these higher ratios would tend to unnecessarily burden the product separation facilities and would require the uneconomical recycling of large volumes of $H_2S$ to the reaction zone.

Mol Ratio $H_2$ to $CS_2$ — The mol ratio of $H_2$ to $CS_2$ employed in the feedstream for this invention is broadly in the range of from 0.1/1 to 10/1, preferably from 0.25/1 to 5/1.

Pressure — The pressure employed in the process of the instant invention is broadly from atmospheric pressure up to 1,000 psig with a preferred range of from 150–700 psig. Product separation processes downstream are benefited by the application of pressure in the reaction zone. Preferably, there should be selected a pressure that is insufficient to cause liquefaction of the reactants in the reaction zone. The pressure selected then will be dependent somewhat on the temperature chosen and the composition of the feedstream.

Temperature — The hydrogenation of $CS_2$ according to the instant invention is generally conducted within a temperature range of from 300°–650° F, preferably from 350°–550° F.

Space Velocity — The process of this invention in which a mixture of $CS_2$, $H_2S$, and $H_2$ are contacted with a sulfactive hydrogenation catalyst under conditions described above is conducted under conditions such that the space velocity can be expressed in gaseous volumes of reactants per volume of catalyst per hour. Broadly, the space velocity employed is from 100–5,000, preferably from 500–2,200 in the units just described.

The effluent from the reaction zone can be subjected to conventional separation processes such as fractional distillation to recover the desired methyl mercaptan, $CH_3SH$, from unreacted $CS_2$, $H_2$, and $H_2S$ as well as by-product $(CH_3)_2S$. Any or all of the above compounds can be recycled to the reaction zone. However, if desired, $(CH_3)_2S$ and $H_2S$ (in excess of that needed in the reaction zone) can be recovered as valuable separate by-product streams since they have well-known utility in other chemical applications.

Methyl mercaptan is a valuable chemical which is employed in large quantities in the preparation of insecticides, herbicides, and methionine, an amino acid used in feed supplements for poultry and livestock.

Although $CS_2$ from any source can be employed as a reactant in the process of this invention, the instant invention has particular utility in those instances wherein the reaction of methane ($CH_4$) with sulfur or a mixture of sulfur and $H_2S$ is employed to produce $CS_2$. In such instances there is a net production of $H_2S$ along with $CS_2$ both of which are needed in the process of the instant invention. Thus, the instant invention provides opportunity for a well-integrated process for producing $CH_3SH$ starting from $CH_4$. It is noted that a one-step reaction for the conversion of $CH_4$ and sulfur to $CH_3SH$ has apparently not been successfully developed because of the extreme difficulty in stopping the reaction at the $CH_3SH$ stage.

Of runs made, those which are presented in the following examples are representative of the invention.

EXAMPLE I

A tubular reaction chamber containing 80 ml of the Aero HDS-2 catalyst was employed as the reaction zone in the runs described below. Each run was conducted at a pressure of 180 psig and a temperature of 450° F. The feed rate for $H_2$ and $CS_2$ in each run was 1.1 and 0.4 mols/hour, respectively, except in run 3 of Table I in which the rate was 2.2 and 0.8, respectively. The feed rate of $H_2S$ was varied in this series of runs including four control runs in which no $H_2S$ was added. The results obtained in this series of runs are shown in Table I.

TABLE I

| $H_2S$ mols/hr. | Space Velocity | Product, Mol % | | | Mol Ratio $CH_3SH/(CH_3)_2S$ | $CS_2$ Conv. % |
| | | $CH_3SH$ | $(CH_3)_2S$ | $CS_2$ | | |
|---|---|---|---|---|---|---|
| 0 | 420 | 32.8 | 26.4 | 40.9 | 1.24 | 67.7 |
| 0 | 420 | 34.7 | 20.2 | 45.0 | 1.72 | 63.4 |
| 0 | 840 | 9.2 | 7.7 | 83.1 | 1.19 | 22.8 |
| 0* | 420 | 31.6 | 21.3 | 47.1 | 1.50 | 61.2 |
| 0.6* | 588 | 42.9 | 17.8 | 39.3 | 2.40 | 66.6 |
| 1.2 | 756 | 51.3 | 13.7 | 35.0 | 3.74 | 69.2 |
| 2.4 | 1092 | 58.1 | 10.2 | 31.6 | 5.70 | 71.2 |
| 4.0 | 1540 | 49.7 | 2.9 | 47.4 | 17.14 | 53.9 |

*These runs conducted at 170 psig.

The above results clearly demonstrate the beneficial effects on $CH_3SH$ yield and ratio of $CH_3SH/(CH_3)_2S$ in the product mixture. Space velocity in the above table is in the units gaseous volumes of reactants per volume of catalyst per hour. The comparison of the second and third runs, in neither of which $H_2S$ was present, shows a very large drop in $CS_2$ conversion with increased space velocity, also, a substantial loss in $CH_3SH/(CH_3)_2S$ ratio. Values shown for product, mole percent are obtained by gas-liquid chromatography analysis and are normalized to exclude $H_2S$ which does appear in the product mixture.

EXAMPLE II

To demonstrate that the above desirable results of Example I were not the result of a simple diluent effect, other runs were conducted in which $N_2$ rather than $H_2S$ was fed to the reaction zone. The results of these runs are shown below in Table II. The temperature, pressure and feed rates for the $H_2$ and $CS_2$ were the same as those employed in Example I and the same reactor and catalyst were also employed.

TABLE II

| $N_2$ Mols/Hr | Space Velocity | Product, Mol % | | | Mol Ratio $CH_3SH/(CH_3)_2S$ | $CS_2$ Conv. % |
|---|---|---|---|---|---|---|
| | | $CH_3SH$ | $(CH_3)_2S$ | $CS_2$ | | |
| 0 | 420 | 31.3 | 24.9 | 43.8 | 1.26 | 64.9 |
| 0.6 | 588 | 23.8 | 20.4 | 55.8 | 1.17 | 53.5 |
| 1.2 | 756 | 18.6 | 14.3 | 67.1 | 1.30 | 41.3 |
| 2.4 | 1092 | 12.1 | 10.1 | 77.7 | 1.20 | 29.4 |

The above results show that the addition of an inert diluent actually reduced $CH_3SH$ yield and $CS_2$ conversion. This supports the unexpected results of the invention. Moreover, the ratio of $CH_3SH/(CH_3)_2S$ was apparently not significantly sensitive to the presence of the inert diluent. The results are obviously quite different from those runs shown in Example I, 5–8, which were carried out according to the invention.

EXAMPLE III

Other runs were conducted according to the invention wherein the temperature and $H_2$ feed rate were varied. The pressure was 180 psig in each run and the feed rates for $H_2S$ and $CS_2$ were 4.0 and 0.4 mols/hour, respectively. The same reactor and catalyst as previously employed in Examples I and II were also used in these runs. The results obtained in this series of runs are presented in Table III below.

TABLE III

| Temp. °F | $H_2$ mols/hour | Space Velocity | Product, Mol % | | | Mol Ratio $CH_3SH/(CH_3)_2S$ | $CS_2$ Conv. % |
|---|---|---|---|---|---|---|---|
| | | | $CH_3SH$ | $(CH_3)_2S$ | $CS_2$ | | |
| 450 | 1.1 | 1540 | 42.7 | 3.2 | 54.1 | 13.42 | 47.5 |
| 460 | 1.1 | 1540 | 48.2 | 4.3 | 47.5 | 11.15 | 54.4 |
| 465 | 1.3 | 1596 | 71.3 | 6.1 | 22.7 | 11.72 | 78.7 |
| 480 | 1.3 | 1596 | 76.3 | 7.0 | 16.7 | 10.92 | 84.4 |
| 490 | 1.4 | 1624 | 83.4 | 8.3 | 8.3 | 10.06 | 92.3 |
| 500 | 1.4 | 1624 | 87.5 | 8.5 | 4.0 | 10.29 | 96.3 |

The above data demonstrate that good results can be achieved according to this invention over a range of temperatures and a range of $H_2$ feed rates.

From the data and description of the invention herein it is evident that the $H_2S$ considerably and unexpectedly improves or retains the $CS_2$ conversion while permitting higher space velocities.

Reasonable variation and modification are possible within the scope of the foregoing disclosure and the appended claims to the invention the essence of which is that there can be the inclusion of hydrogen sulfide in the manner and according to the conditions herein described which with increased space velocities thus obtained, will yield increased carbon disulfide conversions and considerably improve methyl mercaptan to dimethyl sulfide ratios in the product.

I claim:

1. A process for the conversion of carbon disulfide to methyl mercaptan and unavoidably to dimethyl sulfide which comprises hydrogenating carbon disulfide in the presence of hydrogen and a sulfactive hydrogenation catalyst and hydrogen sulfide added in an amount with respect to the carbon disulfide effective to permit substantially over a broad range an increase in space velocity with concomitant increase in conversion of carbon disulfide to methyl mercaptan at the expense of dimethyl sulfide wherein the mol ratio of $H_2S$ to $CS_2$ is in the approximate range of from about 0.5/1 to about 20/1, the mol ratio of hydrogen to carbon disulfide is in the approximate range of from about 0.1/1 to about 10/1, the pressure is in the approximate range from about atmospheric to about 1,000 psig, the temperature is in the approximate range of from about 300° to about 650°F, and the space velocity is in the approximate range of from about 100 to about 5,000 expressed as gaseous volumes of reactants per volume of catalyst per hour.

2. A process according to claim 1 wherein the catalyst is a sulfactive hydrogenation catalyst having approximately the following composition: CoO, 3–4 percent by weight; $MoO_3$, 15–16 percent; $Na_2O$, 0.4 percent; Fe, 0.05 percent; and the remainder consisting essentially of alumina.

3. A process according to claim 1 wherein the mol ratio of $H_2S$ to $CS_2$ is from about 1.5/1 to about 10/1 and the space velocity is in the range of from 500 to 2,200 gaseous volumes of reactants per volume of catalyst per hour.

* * * * *